(No Model.)

S. B. SARE.
CHECK ROW PLANTER.

No. 482,437. Patented Sept. 13, 1892.

Witnesses
Albert Speiden
Lillie M. Hillyard

Inventor
Storm B. Sare
By his Attorneys
R.S. & A.P. Lacey

UNITED STATES PATENT OFFICE.

STORM BONAPART SARE, OF NARKA, KANSAS.

CHECK-ROW PLANTER.

SPECIFICATION forming part of Letters Patent No. 482,437, dated September 13, 1892.

Application filed April 16, 1892. Serial No. 429,477. (No model.)

*To all whom it may concern:*

Be it known that I, STORM BONAPART SARE, a citizen of the United States, residing at Narka, in the county of Republic and State of Kansas, have invented certain new and useful Improvements in Check-Row Planters; and I do hereby declare the following to be a full, clear, and exact description of the invention, such as will enable others skilled in the art to which it appertains to make and use the same.

My invention relates to check-row corn-planters, &c., and aims to dispense with the check-line which is usually stretched over the field and operate the seed-slide directly from a drive-wheel through suitable intermediate mechanism.

The improvement consists of the novel features and the peculiar construction and combination of the parts which will be hereinafter more fully described and claimed, and which are shown in the annexed drawings, in which—

Figure 1:
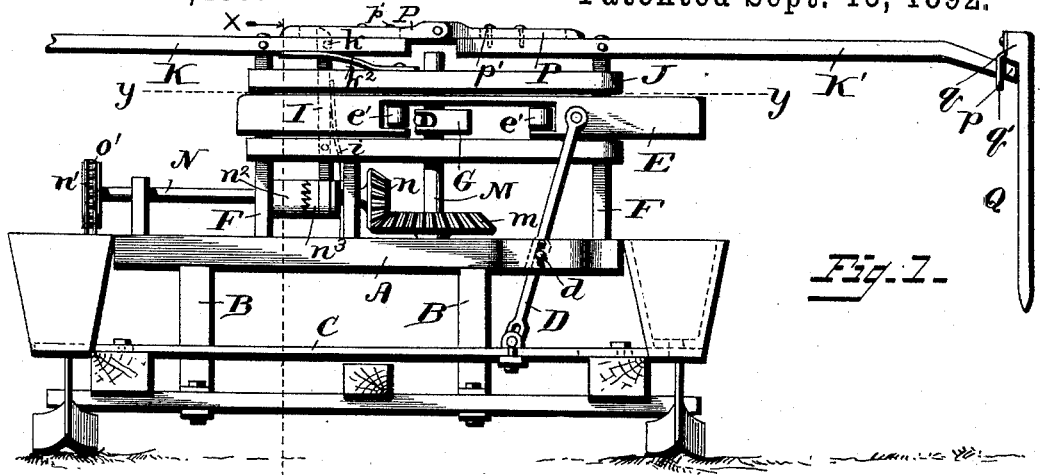
Figures 2, 3:
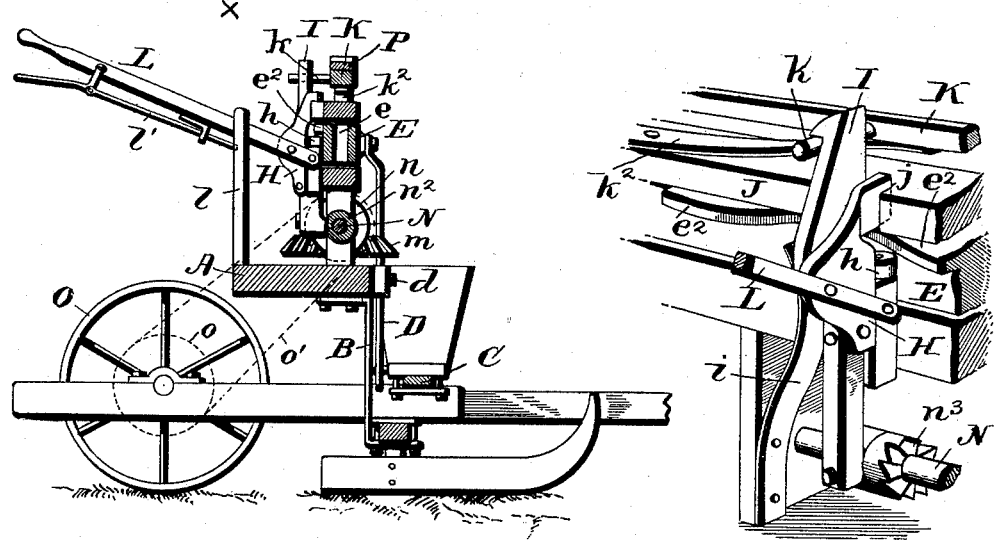
Figure 4:
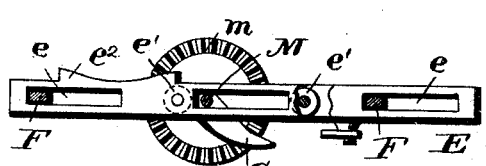
Figure 5:
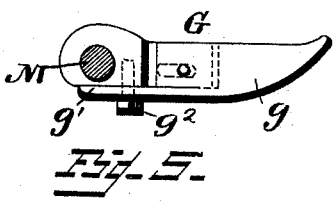

Figure 1 is a front view of a check-row planter embodying my invention. Fig. 2 is a cross-section on the line X X of Fig. 1, showing the lever for throwing the planter in and out of gear. Fig. 3 is a detail view of the hook for retaining the arms which carry the marking-pins in an elevated position at their outer ends, the half-clutch connected with said hook and the spring for disengaging the said hook from a pin projected laterally from one of the said arms. Fig. 4 is a horizontal section on the line Y Y of Fig. 1, parts being broken away to show the construction of the reciprocating bar in detail. Fig. 5 is a detail view of the trip.

The base A, which supports the operating mechanism, is connected with the planter-frame by the approximately Z-shaped brackets B, which are slotted in their horizontal members to permit of the proper adjustment of the said base A to the planter-frame. The seed-slide C is adjustably connected with the lower end of the vertical lever D, which has connection at its upper end with a reciprocating bar E, that is constructed to work on the upper ends of standards F, that are projected up from the said base A. The pin $d$, which forms a fulcrum for the lever D, is vertically adjustable, being adapted to be inserted in one of the series of vertical openings formed in the said base A, thereby varying the stroke of said seed-slide. The lever D is slotted to receive the said pin $d$.

The reciprocating bar E is provided at its ends with slots $e$, through which standards F project to form guides for the said bar. The lower side of the bar E is cut away, and the ends bordering on the cut-away portion are notched and provided with antifriction-rollers $e'$, which are engaged by the trip G in the operation of the machine.

The double-inclined cam $e^2$, projecting from one side of the reciprocating bar E, is constructed to engage with a vertically-disposed antifriction-roller $h$ on the inner edge of a dog H, which is secured to a side of the hook I, so as to have vertical adjustment to bring the said roller $h$ in the plane of the cam $e^2$. This dog H is adapted to engage with a notch $j$ in the cross-bar J, which is secured to the ends of standards F to hold the said hook I in engagement with a pin $k$, projected from the side of an arm K, which latter is pivoted between its ends to the upper end of standard F and extends at right angles to the draft of the planter. The hook I is normally held out of engagement with the pin $k$ by the spring $i$.

The lever L is pivoted near its inner end to the dog H, and is constructed to have its inner end engaged with the block carrying the antifriction roller $h$, so as to elevate the latter when required. This lever extends through the notched end of standard $l$, and is provided with the usual hand-latch $l'$ to engage with the said standard and hold the said lever in the desired position. This lever has a twofold office to fill—namely, to operate the hook I and actuate the block carrying the roller $h$. The trip G is secured to the upper end of the vertical shaft M and is adjustable in length to vary the throw of the reciprocating bar E. The shoe $g$ is slotted in its rear side to receive a tongue which projects from the hub portion of the said trip with which it has connection by the pin and has a slotted extension $g'$, which extends in front of the said hub portion and is connected therewith by the set-screw $g^2$. Obviously when the screw $g^2$ is loosened the shoe $g$ can be moved on the hub portion to lengthen or shorten the trip as required, and is held in a relatively-fixed position by tightening the said screw $g^2$.

The horizontal shaft N, mounted in suitable bearings on the base A, is provided at its inner end with pinion $n$, which is in mesh with gear-wheel $m$ on the shaft M, and is provided at its outer end with sprocket-pinion $n'$, which receives motion from sprocket-wheel $o$, which is secured to drive-wheel O by means of the sprocket-chain $o'$, which passes around said pinion $n'$ and sprocket-wheel $o$. This shaft N is preferably constructed of two parts, which are adapted to be connected by a suitable clutch, whereby when the clutch is in gear both parts will revolve together and when ungeared one part may be revolved independently of the other. The inner end of the outer part of shaft N is provided with a half-clutch $n^2$, and the sleeve $n^3$, mounted on the inner part of the said shaft so as to move thereon, is provided on its opposing end with a corresponding half-clutch, and is constructed to have engagement with and be operated by the hook I.

The arm K, that is pivoted to one of the standards F, is turned down at its outer end and is provided with a head $p$ for the purpose presently to be described. A similar arm K' is pivoted to the upper end of the other standard F, the two arms being connected at their inner ends by an adjustable hinged connection, which will admit of the two arms tilting freely on the standards F. The hinged connection in the present instance comprises two slotted bars P, which are held to the said arms by headed fastenings $p'$, which extend through the slots in the said bars. It will be seen that these bars have a sliding motion on the arms in the operation of the latter.

The marking-pin Q is constructed to be engaged with the headed end $p$ of either of the arms K and K' in such a manner that the said arm carrying the marking-pin will automatically disengage itself from the said marking-pin when the latter is stuck in the ground at the required position by the lowering of the outer end of the said arm. This pin is provided with an overhanging portion $q$ to rest on the top of the arm and with a forked plate $q'$ to embrace the sides of the said arm and engage with the said head $p$ thereof.

When the machine is in gear, the hook I engages with the pin $k$ and holds the arms K and K' in an approximately horizontal position, the hook being held in engagement with the said pin $k$ by the dog H entering the notch $j$. In the rotation of the shaft M the trip G engages with the rollers $e'$ and reciprocates the bar E and operates the seed-slide C through the lever D to drop the seed. The marking-pin at the outer end of either the arms K or K' is dropped to mark the last row the moment the lever L is actuated to ungear the clutch. The inner ends of the arms K and K' are pressed upward by a spring $k^2$ the instant the pin $k$ is released from hook I, thereby depressing the outer ends of the said arms and sticking the marking-pin in the ground.

Having thus described my invention, what I claim, and desire to secure by Letters Patent, is—

1. In a check-row planter, the combination of shaft M, adapted to be actuated from a drive-wheel of the machine, a trip on the said shaft, a reciprocating bar having one side cut away to form abutting shoulders for the said trip to engage with, a seed-slide, a lever connecting the seed-slide with the said reciprocating bar and having a slot midway of its end, and a pin adjustably connected with the frame of the machine and adapted to enter the slot in said lever, substantially as described.

2. In a check-row corn-planter, the combination of the standards F, a reciprocating bar slotted at its ends to receive the said standards and having its middle portion cut away and provided with rollers at the ends of said cut-away portions, a lever having an adjustable fulcrum and adapted to connect the seed-slide with said reciprocating bar, shaft M, operated from a drive-wheel of the planter, and a trip on the said shaft to engage with the said rollers and actuate the said reciprocating bar, substantially as described.

3. In a check-row planter, the combination of shaft M, adapted to be operated from a drive-wheel of the planter, the reciprocating bar E, having connection with and adapted to drive the seed-slide, and a trip adjustable in its length secured to the said shaft M to operate and vary the throw of the said bar, substantially as described.

4. In a check-row corn-planter, the combination, with a pivoted arm K, a hook to engage with the said arm and retain it in a normal position, and a reciprocating bar to operate the seed-slide, of a dog carried by the said hook to hold the latter in an operative position, a block carrying a roller, and a cam on the said reciprocating bar to engage with the said roller and release the dog, substantially as and for the purpose described.

5. In a check-row corn-planter, the combination of shaft N, shaft M, operated from shaft N, a clutch to throw the machine in and out of gear, a hook having engagement with and adapted to gear and ungear the said clutch, a dog and a block carried by the said hook, a lever to independently operate the hook and the said block, an arm adapted to carry the marker and be held in a normal position by the said hook, and a reciprocating bar having a cam to engage with the said roller on the block to liberate the hook and the said arm, substantially as described.

6. In a planter, the combination, with an arm and means for actuating the same, of a marking-pin having a head portion and provided with a forked plate to embrace the sides of the said arm and retain the pin in place, substantially as described.

7. In a planter, the combination, with two arms extending in opposite directions and pivoted between their ends, of an adjustable hinge connection uniting the inner ends of the said arms, substantially as set forth.

In testimony whereof I affix my signature in presence of two witnesses.

STORM BONAPART SARE.

Witnesses:
T. A. SARE,
H. BECK.